United States Patent [19]

Schwartz

[11] 4,436,427
[45] Mar. 13, 1984

[54] PHOTOELECTRIC MEASUREMENT OF MOVING FILAMENTARY MATERIAL

[75] Inventor: Hermann Schwartz, Pfäffikon

[73] Assignee: Siegfried Preyer, Switzerland

[21] Appl. No.: 347,277

[22] Filed: Feb. 9, 1982

[30] Foreign Application Priority Data

Feb. 18, 1981 [CH] Switzerland ............... 1078/81

[51] Int. Cl.³ .................................. G01B 11/10
[52] U.S. Cl. ................... 356/385; 250/214 B; 250/560; 340/677; 356/238; 356/429
[58] Field of Search ............... 356/238, 384, 385, 386, 356/387, 429, 430, 431; 250/560, 562, 214 B, 22; 331/66; 340/677

[56] References Cited

U.S. PATENT DOCUMENTS

| 3,340,400 | 9/1967 | Quittner | 250/562 |
| 3,453,053 | 7/1969 | Gunn-Russell | 356/238 |
| 3,842,257 | 10/1974 | Köhler | 250/221 |
| 3,907,440 | 9/1975 | Eichenberger et al. | 356/429 |
| 4,091,368 | 5/1978 | Schwartz | 356/385 |

FOREIGN PATENT DOCUMENTS 1450232 7/1966 France ................. 250/562

Primary Examiner—R. A. Rosenberger
Attorney, Agent, or Firm—Roylance, Abrams, Berdo & Goodman

[57] ABSTRACT

A light source is energized by pulses controlled by a frequency standard taken from a resonant circuit output. The resonant circuit acts as a narrow-band filter and comprises the capacitance of a photoresponsive receiver and an associated inductor so that a desired filter frequency is obtained. The accurate coincidence of the light source pulse frequency and the resonant circuit acting as a narrow-band output filter permits optical interference acting on the measuring apparatus to be effectively suppressed.

6 Claims, 2 Drawing Figures

PHOTOELECTRIC MEASUREMENT OF MOVING FILAMENTARY MATERIAL

The invention relates to a method and apparatus for the photoelectric measurement of the diameter of moving filamentary material, such as thread, by means of pulsed measuring light traversing a measuring gap.

BACKGROUND OF THE INVENTION

In the production of yarns and similar filamentary materials, they are generally continuously checked with respect to the diameter produced or the already existing diameter or the thread thickness and modifications are made to the production process if there are found to be unacceptable variations from the required diameter. These variations can relate to small areas of the thread, i.e. short lengths, such as knot-like structures which occur when spinning textile threads, or over larger areas or lengths as occur in the production of metal filaments. In order to be able to detect these unallowable variations as early as possible and before long lengths of the faulty material have been produced, the monitoring apparatus must be able to recognize short, transient variations just as reliably as slow, trend-forming variations from the very time they start.

Thus, for example, an electronic yarn cleaner continuously monitors a thread running off a bobbin to establish whether the yarn diameter produced differs from the desired diameter and, in the event of an unacceptable variation, a cutting device is actuated to cut the thread. During the subsequent knotting process, the defective point can be removed from the yarn. In connection with this monitoring process, it is important to be able to measure the moving yarn in a contact-free manner and to obtain an electrical signal which is exactly proportional to the thread diameter.

Thus, in practice, a suitable measuring apparatus generally, but not necessarily has a light source and a photovoltaic cell arranged with a minimum spacing. A thread passing through the central area of this measuring arrangement reduces, as a function of its diameter, the quantity of light striking the photovoltaic cell and, in proportion thereto, the voltage of current delivered by the cell. This modification in the behavior of the photovoltaic cell caused by the thread diameter is amplified to the appropriate signal level by using known means and becomes the thread signal for further signal evaluation.

There is considerable interference to the thread signal when using a stable light source, e.g. a filament lamp, as a result of the ambient light striking the photovoltaic cell, but also due to the virtually unavoidable 100 or 120 Hz content of the electric room illumination. Therefore, it is preferred that only semiconductor devices (light-emitting diodes) are used as the light source because these can be operated with electric pulses of a relatively high frequency.

It is conventional practice to use pulse repetition frequencies of about 100 kHz to be able to detect short-length irregularities in the diameter when the thread is moving at high speed. Such a pulse repetition frequency, as the thread signal carrier, can be transmitted substantially free from the indicated environmental influences by a filter with high-pass characteristics in the subsequent amplifier.

As normal high-pass filters have a relatively large band width, interfering environmental influences with corresponding high frequency contents can still lead to interference with the thread signal. Such interference is due e.g. to light sources, mainly from the fluorescent tubes usually used for room illumination or other gas discharge lamps. As is known, in this type of illumination, the ionization is extinguished during each zero crossing of the AC voltage and ignited again at a predetermined voltage value of the following half-wave. At the time of reignition there is a very rapid rise of the light intensity, so that the differential content of the room illumination reaching the photoreceiver can superimpose pulses of 100 to 120 Hz on the thread signal, in spite of the use of a high-pass filter. Additional high frequency interference sources can be the inductive cross-talk on feed lines and transients resulting from the switching of electrical equipment.

BRIEF SUMMARY OF THE INVENTION

An object of the present invention is to provide an apparatus for measuring the diameter of filamentary materials which does not have the aforementioned disadvantages and which, despite high response sensitivity to transient or systematic variations in the diameter of the measured thread material, is not sensitive to interference, particularly that of an optical nature.

A further object of the invention is to so construct the measuring apparatus that these advantages are obtained with limited circuitry expenditure.

Yet another object of the invention is to so construct the apparatus that in miniaturized form it can be constructed as an integrated circuit.

Briefly described, the invention includes a method of measuring the diameter of longitudinally moving filamentary material including providing a pulsed source of light and a photoresponsive detector facing and on opposite sides of a measuring gap, running the filamentary material through the gap, providing a resonant current coupled to the output of the photoresponsive detector for rejecting signals other than those resulting from the pulsed source of light, and energizing the source of light with pulses from the same resonant circuit, thereby synchronizing the light pulses from the source with the photoresponsive circuit to permit noise rejection.

In another aspect, the invention comprises an apparatus for detecting size variations in a filamentary material comprising a light source; photoresponsive means mounted in spaced relationship from said source for producing electrical signals representative of the light from said source, the space between said source and photoresponsive means forming a gap through which filamentary material can be run; resonant circuit means coupled to the output of said photoresponsive means for rejecting signals differing in frequency from the frequency of said resonant circuit means; and means coupled to said resonant circuit means for pulsing said light source at a frequency correlated with said resonant circuit.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a schematic circuit diagram of an apparatus in accordance with the invention; and FIG. 2 is a schematic diagram of a further embodiment of an apparatus in accordance with the invention.

DETAILED DESCRIPTION OF THE PREFERRED EMBODIMENTS

A far better suppression of environmental influences can be achieved if the measuring apparatus contains a resonant circuit instead of a high-pass filter. If the resonant circuit has a high quality (Q), the pass band width becomes very narrow and also helps to increase the signal strength. However, this presupposes that the pulse frequencies of the light source and, on the light receiver side, the resonant circuit are very accurately matched to each other. Additionally, both must have a high long-term stability which, is as known, is very difficult to achieve. In addition, it is not the absolute frequency which is decisive, but the precise and stable coincidence of the pulse frequency of the light source and the resonant circuit serving as the filter. According to the invention, this problem is solved in that the resonant circuit serves both as the light receiver filter and as the light transmitter frequency standard, as is illustrated by FIG. 1.

The photovoltaic cell, used in the preferred embodiments as the photoresponsive means due to its large light-sensitive surface has, as a result of its construction, a very high internal capacitance, i.e. parallel to its connections there is virtually a relatively large capacitor which, as a function of the size and manufacturing process of the photovoltaic cell, can be as much as several thousand picofarads. This causes numerous problems when transmitting high frequency pulses, which can only be eliminated by a very low value of the circuit resistance. If this is a normal passive resistance, this load leads to very high signal losses. Therefore, measures should be taken which substantially actively utilize the current of the photovoltaic cell.

Figure 1:
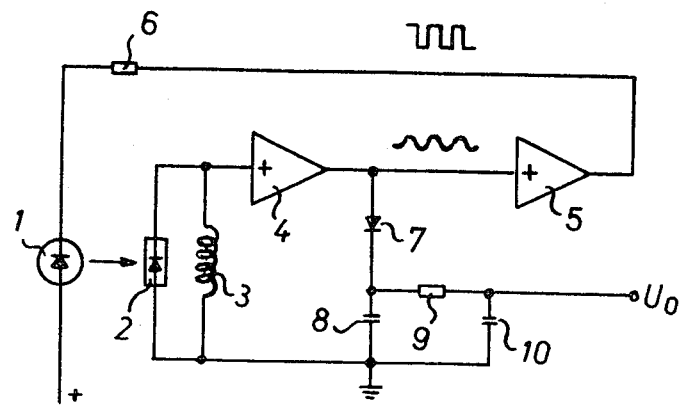
Figure 2:
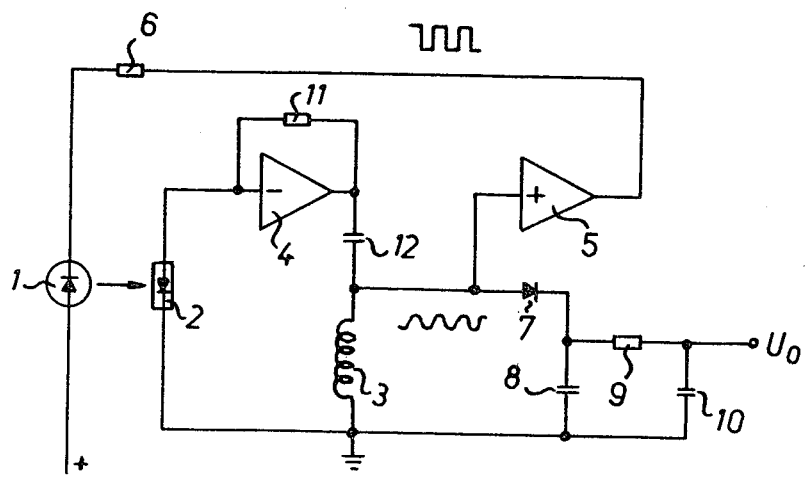

FIGS. 1 and 2 show embodiments which are ready for use and which are characterized by simplicity of the circuitry.

In FIG. 1, a matching inductor 3 is connected in parallel to photovoltaic cell 2, so that a resonant parallel circuit, resonant at the desired frequency, is formed from the capacitance of photovoltaic cell 2 and inductor 3. By incorporating the capacitance of photovoltaic cell 2 into the resonant circuit, there is an optimum and virtually loss-free adaption of cell 2, due to the particular current flow in the circuit. As a function of the circuit quality Q, the signal voltage delivered by the resonant circuit is also considerably increased, so that the light source 1 only requires a relatively low power level.

The high frequency AC voltage from resonant circuit 2, 3 is amplified to a suitable signal level by means of an amplifier 4. From the output of amplifier 4, the AC voltage passes to the input of a high-speed switch 5, which converts the sine-wave voltage into square-wave pulses, thus acting as a pulse shaper. Switch 5 can be a suitable comparator with an open collector output, e.g. Motorola component LM 311. The high frequency pulses derived from the AC voltage then pass across the current-limiting resistor 6 to the semiconductor light source 1, e.g. a light-emitting diode or LED, from where they return as light pulses via photovoltaic cell 2 to resonant circuit 2, 3, which again converts the pulses into a sine-wave voltage.

At the output of amplifier 4, there are also a rectifying diode 7 and filter elements 8, 10, 9 for the high frequency AC voltage, so that at point $U_O$ the thread signal superimposed on the high frequency carrier can be taken and evaluated.

Because of variations in the capacitance of photovoltaic cell 2, particularly when replacing the cell by one of a different size, the desired frequency can be subject to excessive variation for a predetermined value of inductor 3. FIG. 2 shows another embodiment of the circuit designed to make the resonant frequency free from the influences of photovoltaic cell 2.

Between photovoltaic cell 2 and the resonant circuit formed by the series connection of capacitor 12 and inductor 2 is connected an inverting amplifier 4 to whose input is supplied the signal from cell 2. A feedback resistor 11 is connected between the input and output of the amplifier, the value of resistor 11 being chosen so that the amplifier is subject to considerable negative feedback and as a result both the input and the output have a low dynamic impedance. Thus, the feedback amplifier acts as an impedance matching circuit. The signal is returned from the resonant circuit via pulse shaper 5 to light source 1 to produce the correlated measuring light pulses, as well across the rectifying diode 7 and the aforementioned filter elements 8, 9, 10 to the output. The output quantity $U_O$ at the output is correspondingly further processed.

The resonant circuits acting as filters can also be constructed with active components. For example, the requisite inductance can be simulated with a transformation circuit, for which a gyrator circuit is particularly well suited. A circuit of this type can include two negative impedance converters (NIC's or INIC's) to simulate an inductance of very high Q. The active elements are two operational amplifiers.

While certain advantageous embodiments have been chosen to illustrate the invention, it will be understood by those skilled in the art that various changes and modifications can be made therein without departing from the scope of the invention as defined in the appended claims.

What is claimed is:

1. A method of measuring the diameter of longitudinally moving filamentary material including
   providing a pulsed source of light and a photoresponsive detector facing and on opposite sides of a measuring gap,
   running the filamentary material through the gap,
   providing a resonant circuit coupled to the output of the photoresponsive detector for rejecting signals other than those resulting from the pulsed source of light, and
   energizing the source of light with pulses from the same resonant circuit, thereby synchronizing the light pulses from the source with the photoresponsive circuit to permit noise rejection.

2. An apparatus for detecting size variations in a filamentary material comprising
   a light source;
   photoresponsive means mounted in spaced relationship from said source for producing electrical signals representative of the light from said source,
   the space between said source and photoresponsive means forming a gap through which filamentary material can be run;
   resonant circuit means coupled to the output of said photoresponsive means for rejecting signals differing in frequency from the frequency of said resonant circuit means; and means coupled to said resonant circuit means for pulsing said light source at a frequency correlated with said resonant circuit.

3. An apparatus according to claim 2 wherein said means for pulsing includes a pulse shaper circuit connected between said resonant circuit means and said light source.

4. An apparatus according to claim 2 or 3 wherein said resonant circuit means comprises the effective capacitance of said photoresponsive means and an inductor element connected in parallel circuit relationship therewith.

5. An apparatus according to claim 2 or 3 wherein said resonant circuit means comprises an impedance matching amplifier circuit, said photoresponsive means being connected to the input thereof, and an inductor connected in series circuit relationship with a capacitor connected to the output of said circuit.

6. An apparatus according to claim 2 wherein said resonant circuit means includes inductive means comprising active elements.

* * * * *